(12) United States Patent
Chien

(10) Patent No.: US 8,223,164 B2
(45) Date of Patent: Jul. 17, 2012

(54) BOOTING METHOD OF COMPUTER SYSTEM AND BOOT LOGO PROCESSING METHOD THEREOF

(75) Inventor: Chih-Sheng Chien, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 676 days.

(21) Appl. No.: 12/394,051

(22) Filed: Feb. 27, 2009

(65) Prior Publication Data

US 2009/0219297 A1    Sep. 3, 2009

(30) Foreign Application Priority Data

Mar. 3, 2008    (TW) ................. 97107329 A

(51) Int. Cl.
| | |
|---|---|
| G09G 5/00 | (2006.01) |
| G09G 5/02 | (2006.01) |
| G03F 3/08 | (2006.01) |
| H04N 1/46 | (2006.01) |
| G06K 9/00 | (2006.01) |
| G06K 9/40 | (2006.01) |
| G06F 9/00 | (2006.01) |
| G06K 9/36 | (2006.01) |
| G06F 15/177 | (2006.01) |

(52) U.S. Cl. ........ 345/589; 345/593; 345/619; 345/606; 345/629; 358/519; 358/525; 382/163; 382/167; 382/254; 382/276; 713/2

(58) Field of Classification Search .................. 345/581, 345/589–593, 597, 600, 619, 606, 629, 630, 345/643; 358/518–519, 525; 382/162–163, 382/165–167, 254, 276, 300; 713/1–2, 100
See application file for complete search history.

(56) References Cited

U.S. PATENT DOCUMENTS

| | | | | |
|---|---|---|---|---|
| 6,269,441 B1 * | 7/2001 | Lee et al. | ......................... | 713/1 |
| 6,477,642 B1 * | 11/2002 | Lupo | ................................. | 713/2 |
| 2007/0158335 A1 * | 7/2007 | Mansbery | ...................... | 219/505 |

FOREIGN PATENT DOCUMENTS

| | | |
|---|---|---|
| CN | 1452068 | 10/2003 |
| TW | 546580 | 8/2003 |
| TW | I257570 | 7/2006 |

* cited by examiner

Primary Examiner — Weesner Sajous
(74) Attorney, Agent, or Firm — Jianq Chyun IP Office

(57) ABSTRACT

A boot logo processing method includes the following steps. Palette data and a boot graphic including plurality colors are provided, and the colors include corresponding color values respectively in color gamut of the boot graphic. A boot graphic is provided, and it may be composed of plurality colors. When the number of the colors composing the boot graphic is greater than a default value of the number of the colors provided by the palette data, color value of every color is operated with color values of other colors to obtain plurality operating values. Thereby, in the processing method of the invention, part of the colors in the color gamut of the boot graphic are merged into a single color according to the operating values to decrease the number of the colors composing the boot graphic, and produce the boot logo at least according to the latest boot graphic.

19 Claims, 5 Drawing Sheets

BOOTING METHOD OF COMPUTER SYSTEM AND BOOT LOGO PROCESSING METHOD THEREOF

CROSS-REFERENCE TO RELATED APPLICATION

This application claims the priority benefit of Taiwan application serial no. 97107329, filed Mar. 3, 2008. The entirety of the above-mentioned patent application is hereby incorporated by reference herein and made a part of specification.

BACKGROUND OF THE INVENTION

1. Field of the Invention

The invention relates to a boot logo processing method and, more particularly, to a boot logo processing method of merging color technique.

2. Description of the Related Art

As shown in FIG. 1, when a computer system is booting, it displays a boot logo on its display. FIG. 1 is a diagram showing the boot logo of the computer system. The boot logo generally includes text information and a boot graphic. For example, the prompting message on the bottom of FIG. 2 is text information.

In addition, as shown in FIG. 3, if the computer system utilizes processors of a brand company, a logo of the company appears in the bottom right corner or the top right corner of the boot logo shown in FIG. 1. That is, some boot logos includes text information images, logos, and boot graphics.

For a current computer system, when the computer system is booting, it always uses 256 colors display mode because of system compatibility and the sizes of files. That is, when booting, the computer system can provide 256 colors to compose the boot logo. Generally speaking, the numbers of the colors utilized by the text information image (shown in FIG. 2) and the logo are 16, which is a constant. Therefore color provided by the computer system to the boot graphic is of 224 colors.

However, the boot graphic is appointed by a user. Therefore, the number of needed colors is not constant. If the color needed by the boot graphic include more than 224 colors, distortion occurs when the color is displayed in the boot logo. Conventional solution is utilizing image-processing software to open the boot graphic first, delete some similar colors identified by human eyes until the number of colors composing the boot graphic is less than or equal to 224.

From above, the conventional technique utilizes manpower to process the colors of the boot graphic. Therefore, efficiency of the conventional technique is low. In addition, color acuity of everyone's eyes is not the same; therefore, there is no unified standard to process the boot graphic, which results in that the processed boot graphic may be not natural in representing colors. Furthermore, the boot graphic processed by the conventional technique destroys the boot graphic permanently.

SUMMARY OF THE INVENTION

Therefore, the invention is to provide a computer system booting method which can adjust the number of colors composing a boot graphic In addition, the invention is also to provide a boot logo processing method to process the colors composing the boot logo effectively.

The invention relates to a computer system booting method including the steps of: providing a boot graphic composed of plurality colors; and adjusting the number of the colors composing the boot graphic to produce a boot logo of the computer system.

In another point of view, the invention is also to provide a boot logo processing method. The method includes the steps of: providing palette data and providing a boot graphic including plurality colors, and the colors includes corresponding color values respectively in color gamut of the boot graphic. When the number of the colors composing the boot graphic is greater than a default value of the number of the colors provided by the palette data, operate the color value of every color with color values of other colors to obtain plurality operating values. Thereby, the processing method of the invention can merge part of the colors in the color gamut of the boot graphic into a single color according to the operating values to decrease the number of the colors composing the boot graphic, and produce the boot logo at least according to the latest boot graphic.

In addition, the invention can further provide a text information image and a logo.

In the invention, the step of decreasing the number of the colors composing the boot graphic further includes the steps of: in the color gamut of the boot graphic, calculating distance between color value of every color and color values of other colors to obtain plurality distance values, and comparing the distance values, and when there is only one minimum distance value among the distance values, merging two colors including the minimum distance value into a single color to decrease the number of the colors of the boot graphic.

In addition, when there are plurality minimum distance values among the distance values, compare occurrence times of two color values corresponding to every minimum distance value in the color gamut of the boot graphic; and merge two colors corresponding to the two color values having the minimum distance values and the fewest occurrence number of times in the color gamut of the boot graphic into a single color to decrease the number of the colors of the boot graphic.

The processing method of the invention can merge part of the colors composing the boot graphic into a single color to decrease the number of the colors. Therefore, the invention can process the boot logo effectively and make the boot logo represent colors naturally.

These and other features, aspects, and advantages of the present invention will become better understood with regard to the following description, appended claims, and accompanying drawings.

DETAILED DESCRIPTION OF THE EMBODIMENTS

Figure 4:
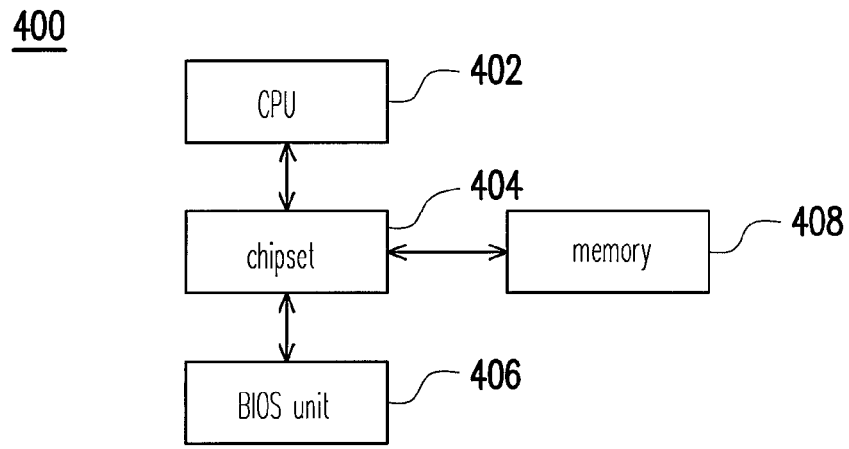
FIG. 4 is a schematic diagram showing the configuration of a computer system.

FIG. 4 is a schematic diagram showing the configuration of a computer system. As shown in FIG. 4, a common computer system 400, such as a desktop computer or a notebook computer, includes a central processing unit (CPU) 402, a chipset 404, a basic input/output system (BIOS) unit 406, and a memory 408. The CPU 402 is coupled to the chipset 404 and coupled to the BIOS 406 and the memory 408 via the chipset 404. Generally speaking, the chipset 404 can include a north bridge chip and a south bridge chip.

Figure 5:
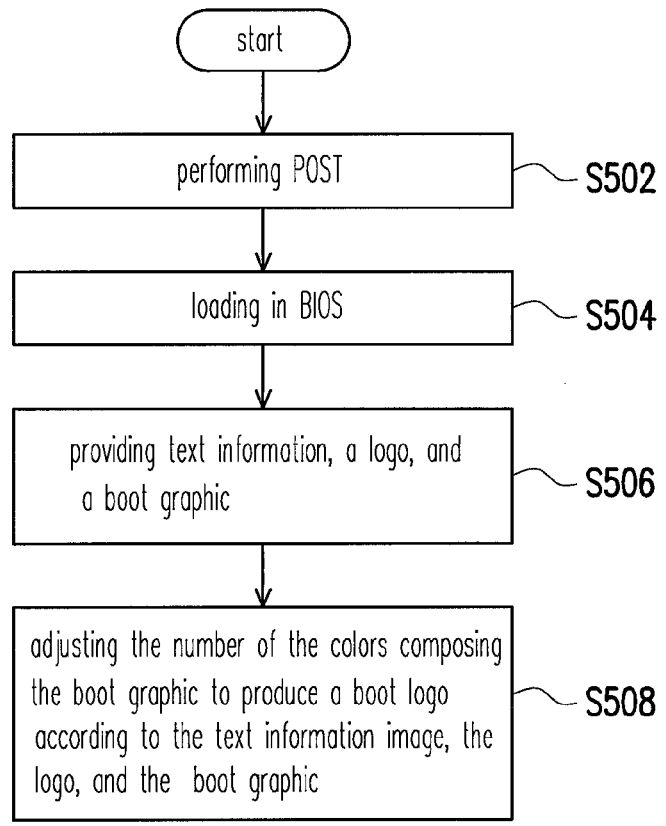
FIG. 5 is a flow chart showing the steps of a boot method of a computer system according to one embodiment of the invention.

FIG. 5 is a flow chart showing the steps of a boot method of a computer system according to one embodiment of the invention. As shown in FIG. 4 and FIG. 5, when booting, the computer system 400 performs power on self test (POST) as shown in S502, decompresses BIOS code embedded in the BIOS unit 406, and loads the decompressed BIOS code to the memory 408 via the chipset 404, which is shown in S504. In the embodiment, the BIOS unit 406 can be realized by a flash memory. In addition, the memory 408 can be a DRAM, a SDRAM, or a DDRAM.

Figure 1:
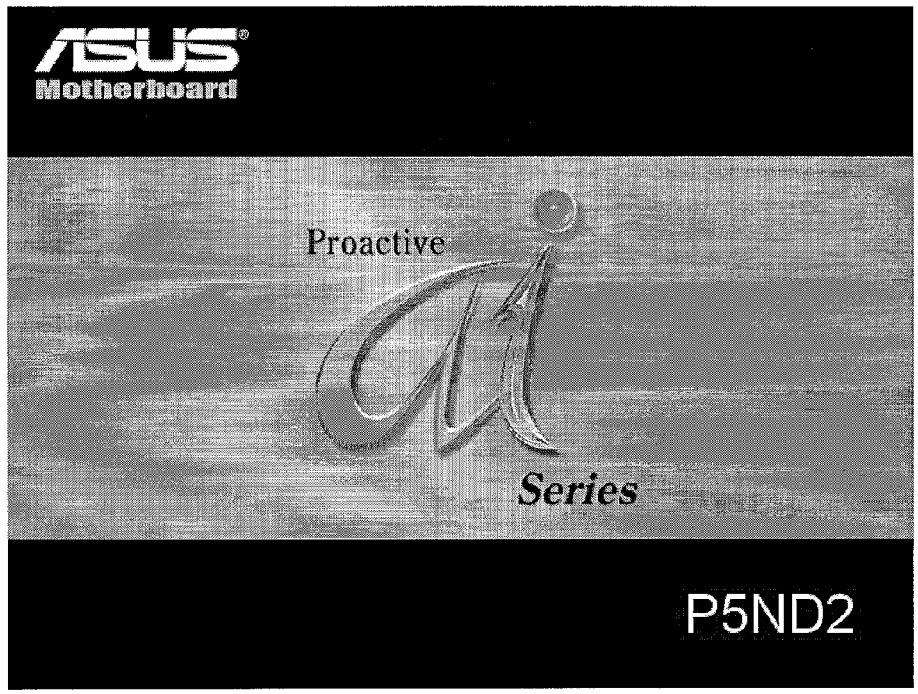
FIG. 1 is a diagram showing a boot logo of a computer system.
Figure 2:
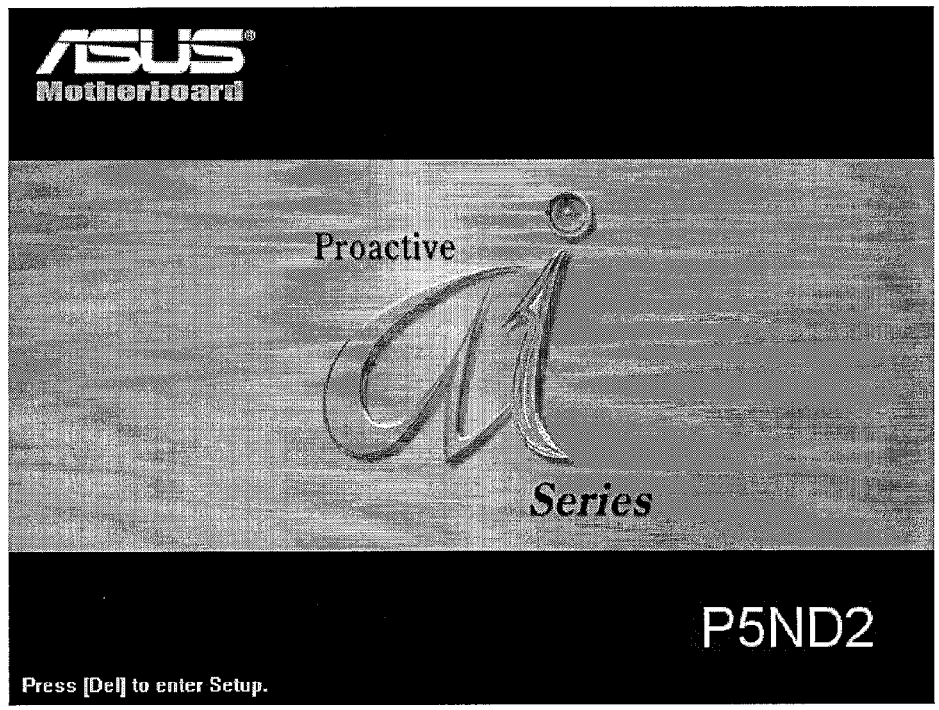
FIG. 2 is a diagram showing a boot logo (including text information) of a computer system.
Figure 3:
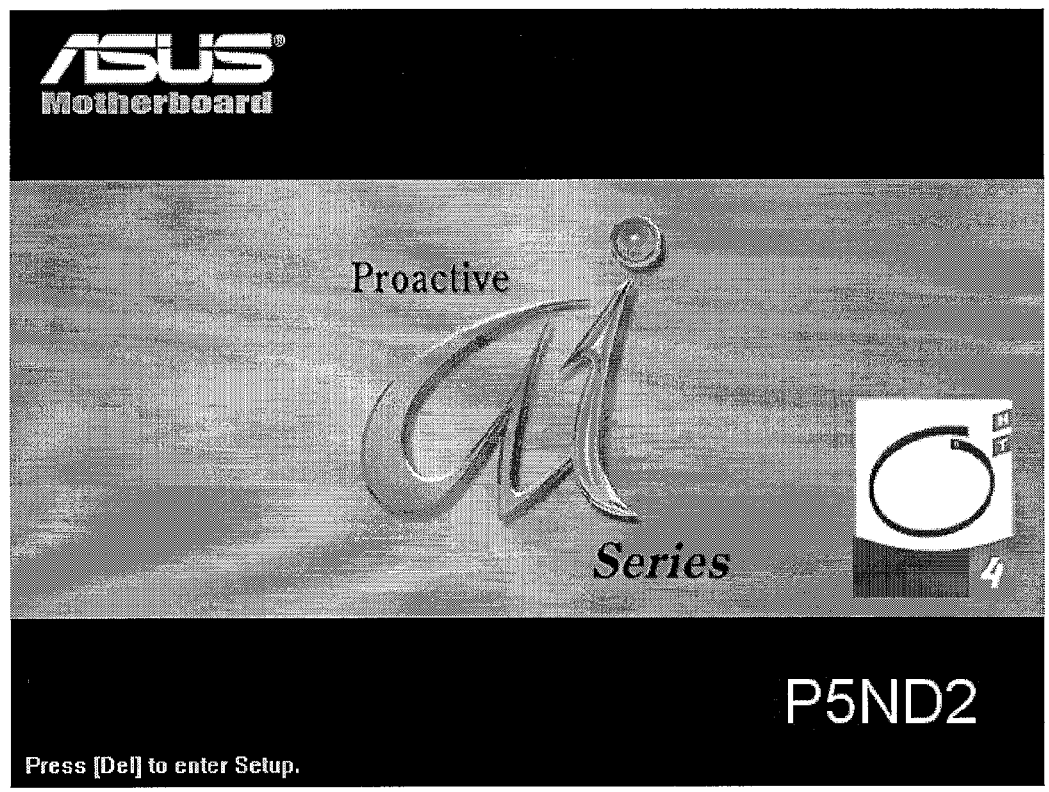
FIG. 3 is a diagram showing a boot logo (including text information and a logo) of a computer system.

Particularly, when the BIOS code is loaded from the BIOS 406 to the memory 408 to run, a boot graphic is decompressed. In the embodiment, the boot graphic shown in FIG. 3 can be composed of plurality colors, can be a bmp file, and can be compressed and stored in the BIOS unit 406. By decompressing the boot graphic, in the embodiment, step S506 which is providing text information, a logo, and the decompressed boot graphic is performed. The decompressed boot graphic does not need to be stored back into the BIOS unit 406. Therefore, source file of the boot graphic is not changed. Wherein, the text information may be the text prompting message in the bottom left corner of FIG. 2.

As show in FIG. 4 and FIG. 5, after finishing step S506, adjust the number of colors composing the boot graphic according to step S508. Thereby, in the embodiment of the invention, a boot logo shown to users when the computer system 400 is booting is produced according to the text information image, the logo, and the boot graphic.

Figure 6:
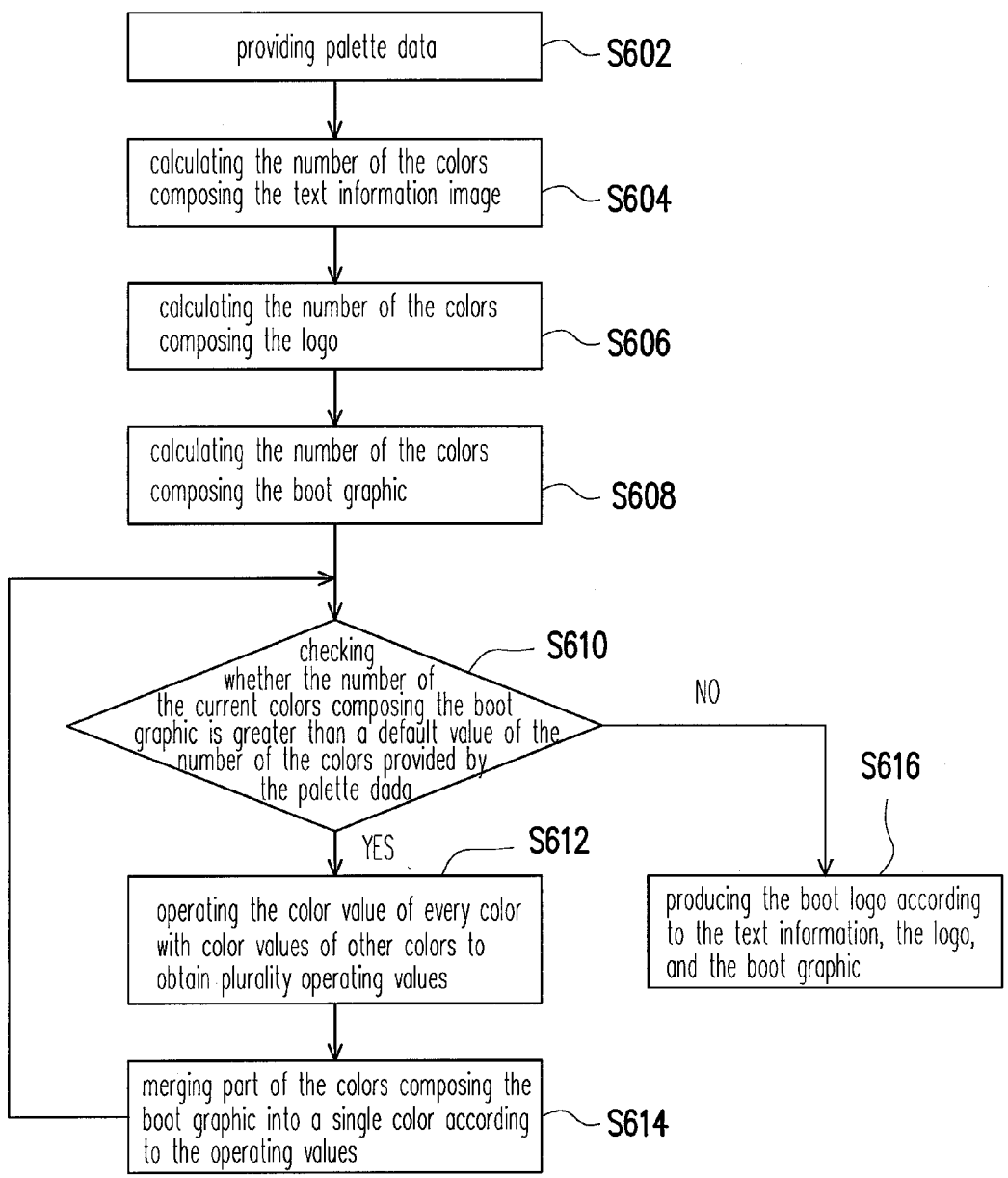
FIG. 6 is a flow chart showing the steps of a boot logo processing method according to one embodiment of the invention.

FIG. 6 is a flow chart showing the steps of a boot logo processing method according to one embodiment of the invention, which is applied to step S508 of FIG. 5. as shown in FIG. 6, when the text information image, the logo, and the boot graphic needs to be processed in the embodiment of the invention, palette data are provided first according to step S602. The palette data can provide plurality colors to process the boot logo of the computer system. In the embodiment, the palette data can provide, for example, color dada of 256 colors. Wherein, the color data include corresponding color values in color gamut.

Furthermore, the processing method according to the embodiment of the invention can go on steps S604 and S606 which are calculating the number of colors composing the text information image and the number of colors composing the logo respectively. In the embodiment, the text information image and the logo can be composed of 16 colors respectively. In the embodiment, the text information image can be composed of black, green, cyan, red, purple, brown, white, dark grey, light blue, light green, pale cyan, light purple, yellow, and bright white. Furthermore, in some embodiments, the 16 colors composing the text information image and the logo can be 16 data disposed at the beginning of the palette data and 16 data disposed at the end of the palette data respectively.

Next, in the processing method according to the embodiment of the invention, step S608 which is calculating the number of the colors composing the boot graphic is performed. The colors composing the text information image and the logo are constant, but the boot graphic can be appointed by a user. Therefore, the number of the colors composing the boot graphic is not constant. Thus, in the embodiment of the invention, whether the current number of the colors composing the boot graphic is greater than a default value of the number of the colors provided by the palette dada may be determined, as shown in step S610. For example, when the maximum number of the colors provided by the palette dada is 256, the number of the colors composing and the text information image and the number of the colors composing the logo are 16 respectively, the palette data may provide only 224 colors for the boot graphic. In other words, the default value in step S612 is 224.

When the number of colors needed by the boot graphic selected by the user exceeds the number (such as 224) of colors of the boot graphic provided by the palette data (which is indicated as "YES" in step S610), in the processing method according to the embodiment of the invention, the color value of every color with color values of other colors in the color gamut of the boot graphic are operated to obtain plurality operating values (step S612). Thereby, in the embodiment of the invention, part of the colors composing the boot graphic may be merged into a single color according to the operating values to decrease the number of the colors composing the boot graphic.

Next, after step S614, in the embodiment of the invention, step S610 may be repeated. When the number of the colors composing the boot graphic is still greater than the default value of the number of colors provided by the palette data, steps S612 and S614 are repeated until the number of the colors composing the boot graphic is less than or equal to the default value. When the number of the colors composing the boot graphic is less than or equal to the default value (such as 224) (which is indicated as "NO" in step S610), the boot logo is produced according to the text information image, the logo, and the boot graphic as shown in step S616.

In the embodiment, there are plurality operating methods of step S612, such as Dithering or Floyd-Steinberg, and the embodiment does not limit the method. Further, the invention provides an algorithm for processing the number of the colors of the boot graphic, which is shown in FIG. 7.

Figure 7:
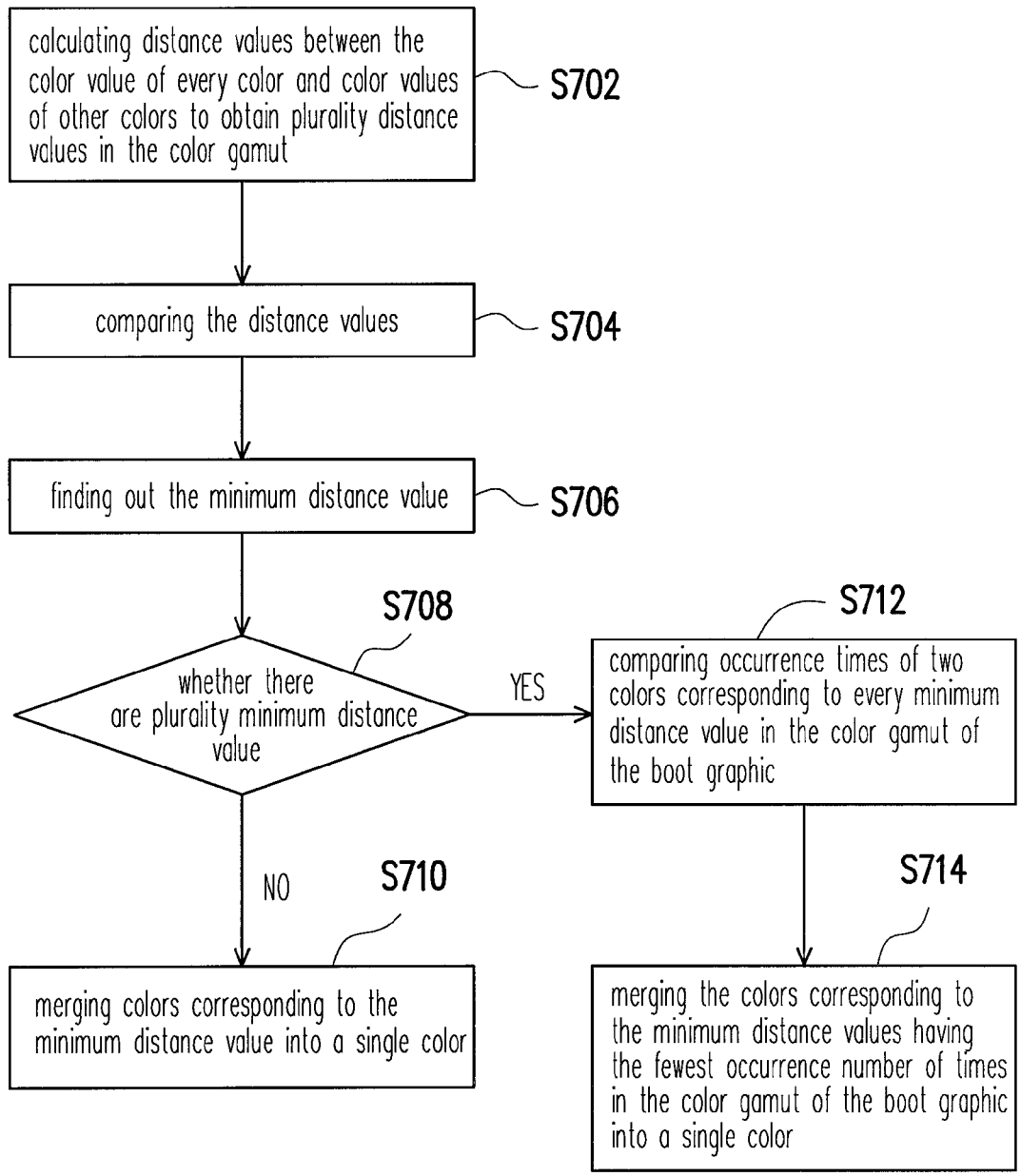
FIG. 7 is a flow chart showing the steps of a method of decreasing the number of colors composing a boot graphic according to one embodiment of the invention.

FIG. 7 is a flow chart showing the steps of a method of decreasing the number of colors composing a boot graphic according to one embodiment of the invention. As shown in FIG. 7, when the number of the colors composing the boot graphic is checked to be greater than the default number of the colors provided by the palette data in step S612 of FIG. 6, then distance values between color value of every color and color values of other colors in the color gamut are calculated to obtain plurality distance values.

It is assumed that the color value of one of the colors composing the boot graphic can be indicated as (R1, G1, B1), and the color value of another one of the colors can be indicated as (R2, G2, B2). Step S702 can be shown as the following mathematics equation:

$$d=(R2-R1)^2+(G2-G1)^2+(B2-B1)^2$$

wherein, d is the distance value between two color values in the color gamut distribution, and R1, R2, G1, G2, B1, B2 indicate red components, green components, and blue components of the colors respectively.

After being calculated, the distance values are compared to find the minimum one among the distance values (step S706). In the embodiment, step S708 is to determine whether there are plurality minimum distance values. If there is only one minimum distance value (which is indicated as "NO" in step S708), the colors corresponding to the two color values having the minimum distance value are merged into a single color.

When there are plurality minimum distance values among the distance values, and the minimum distance values are equal to each other (which is indicated as "YES" in step S708), then occurrence numbers of times of two colors corresponding to every minimum distance value in the color gamut of the boot graphic are compared. In addition, in the embodiment, the colors corresponding to the minimum distance values and having the fewest occurrence times in the color gamut of the boot graphic may be merged into a single color, as shown in step S714. Thereby, the embodiment can decrease the number of the colors composing the boot graphic effectively.

From above, the invention can utilize several algorithms to merge part of the colors composing the boot graphic into a single color. Therefore, the invention can decrease the number of the colors composing the boot graphic effectively and make the boot logo of the computer system more natural.

In addition, in the invention, the boot graphic is compressed and stored in a storage area. When the computer system is booting, the boot graphic is decompressed and processed. Therefore, the original boot graphic is not damaged.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A boot logo processing method for a computer system, wherein the boot logo is shown when the computer system boosts, the method comprises the steps of:
   providing a boot graphic composed of a plurality of colors by the computer system; and
   adjusting the number of the colors composing the boot graphic to produce the boot logo,
   wherein when the number of the colors composing the boot graphic is greater than a default value, the method further comprises the steps of:
   calculating a distance between a color value of each of the color and color values of the other colors to obtain a plurality of distance values in a color gamut of the boot graphic, wherein the colors include corresponding color values respectively in the color gamut of the boot graphic;
   comparing the distance values;
   finding the minimum distance value among the distance values; and
   when there is only one minimum distance value among the distance values, merging two colors including the minimum distance value into a single color to decrease the number of the colors of the boot graphic.

2. The boot logo processing method according to claim 1, further comprising the steps of:
   providing a text information image and a logo, and
   combining the text information image, the logo, and the boot graphic to produce the boot logo.

3. The boot logo processing method according to claim 2, wherein the text information image and the logo are composed of 16 colors, respectively.

4. The boot logo processing method according to claim 2, wherein the colors composing the text information image comprises: black, green, cyan, red, purple, brown, white, dark grey, light blue, light green, pale cyan, light purple, yellow, and bright white.

5. The boot logo processing method according to claim 1, wherein the step of decreasing the number of the colors of the boot graphic further comprises the steps of:
   when there are a plurality of minimum distance values among the distance values, comparing an occurrence number of times of two color values corresponding to each of the minimum distance values in the color gamut of the boot graphic; and
   merging two colors corresponding to the two color values having the minimum distance value and the fewest occurrence number of times in the color gamut of the boot graphic into the single color to decrease the number of the colors of the boot graphic.

6. The boot logo processing method according to claim 1, wherein the default value is 224.

7. The boot logo processing method according to claim 1, wherein the boot graphic is a bmp file.

8. A boot logo processing method for a computer system, wherein the boot logo is shown when the computer system boosts, the method comprises the steps of:
   providing palette data;
   providing a boot graphic including a plurality of colors, wherein the colors include corresponding color values in the color gamut of the boot graphic, respectively;
   when the number of the colors composing the boot graphic is greater than a default value of the number of the colors provided by the palette data, operating the color value of each of the colors with the color values of the other colors to obtain a plurality of operating values in the color gamut of the boot graphic;
   merging a part of the colors in the color gamut of the boot graphic into a single color according to the operating values; and
   producing the boot logo according to the boot graphic by the computer system.

9. The processing method according to claim 8, further comprising the steps of:
   providing a text information image and a logo, and
   combining the text information image, the logo, and the boot graphic to produce the boot logo.

10. The processing method according to claim 9, further comprising the steps of:
    checking whether the latest number of the colors composing the boot graphic is still greater than the default value of the number of the colors provided by the palette dada;
    when the latest number of the colors composing the boot graphic is still greater than the default value of the number of the colors provided by the palette dada, continuing to decrease the number of the colors composing the boot graphic, and
    when the latest number of the colors composing the boot graphic is less than or equal to the default value of the number of the colors provided by the palette dada, producing the boot logo according to the text information image, the logo, and the latest boot graphic.

11. The processing method according to claim 9, wherein the text information image and the logo are composed of 16 colors, respectively.

12. The processing method according to claim 9, wherein the colors composing the text information image and the logo are data at the beginning of the palette data and data at the end of the palette data, respectively.

13. The processing method according to claim 12, wherein the prior 16 color data of the palette data are black, green, cyan, red, purple, brown, white, dark grey, light blue, light green, pale cyan, light purple, yellow, and bright white in sequence for composing the text information image.

14. The processing method according to claim 8, further comprising the steps of:
compressing the boot graphic,
storing the compressed boot graphic in a basic input/output system of a computer system; and
when the computer system is booted, decompressing the boot graphic stored in the basic input/output system.

15. The processing method according to claim 8, wherein the boot graphic is a bmp file.

16. The processing method according to claim 8, wherein the step of when the number of the colors composing the boot graphic is greater than the default value of the number of the colors provided by the palette data, operating the color value of each of the colors with the color values of the other colors to obtain the plurality of operating values in the color gamut of the boot graphic comprises the steps of:
in the color gamut of the boot graphic, calculating a distance between the color value of each of the colors and the color values of the other colors to obtain a plurality of distance values;
comparing the plurality of the distance values;
finding out the minimum distance value among the plurality of the distance values; and
when there is only one minimum distance value among the plurality of the distance values, merging two of the colors having the minimum distance value into the single color.

17. The processing method according to claim 8, wherein the step of merging a part of the colors in the color gamut of the boot graphic into the single color according to the operating values comprises the steps of:
when there are a plurality of minimum distance values among the distance values, comparing an occurrence number of times of two color values corresponding to each of the minimum distance values in the color gamut of the boot graphic; and
merging two colors corresponding to the two color values having the minimum distance values and the fewest occurrence number of times in the color gamut of the boot graphic into the single color to decrease the number of the colors of the boot graphic.

18. The processing method according to claim 8, wherein the palette data provide 256 colors.

19. The processing method according to claim 8, wherein the default value is 224.

* * * * *